(12) United States Patent
Yamamoto

(10) Patent No.: US 7,483,193 B2
(45) Date of Patent: Jan. 27, 2009

(54) LIGHT SCANNING DEVICE AND IMAGE FORMING DEVICE

(75) Inventor: Yoshihiro Yamamoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/783,677

(22) Filed: Apr. 11, 2007

(65) Prior Publication Data

US 2008/0024850 A1    Jan. 31, 2008

(30) Foreign Application Priority Data

Jul. 27, 2006    (JP)    ............................. 2006-204676

(51) Int. Cl.
  *G02B 26/08* (2006.01)
(52) U.S. Cl. .................................................. 359/204
(58) Field of Classification Search ................. 359/204, 359/216
  See application file for complete search history.

(56) References Cited

U.S. PATENT DOCUMENTS 5,715,078 A * 2/1998 Shiraishi ..................... 359/204
6,396,615 B1 5/2002 Hama et al.
2004/0056185 A1 3/2004 Yoo
2004/0184127 A1 9/2004 Nakajima et al.
2004/0233496 A1 11/2004 Kim

FOREIGN PATENT DOCUMENTS

| JP | 2001-10107 | 1/2001 |
|----|------------|--------|
| KR | 2004-25320 | 3/2004 |
| KR | 2004-100053 | 12/2004 |

* cited by examiner

*Primary Examiner*—Euncha P Cherry
(74) *Attorney, Agent, or Firm*—Morgan, Lewis & Bockius LLP

(57) ABSTRACT

A light scanning device includes: a housing; a light deflector provided at the housing, and rotating deflecting surfaces thereof around a rotating shaft, and deflecting light beams; plural light sources provided at the housing, and emitting the light beams in a direction that intersects the rotating shaft of the light deflector; an imaging optical system provided at the housing, and focusing each of the plural light beams deflected by the light deflector onto a surface-to-be-scanned; and an optical path changing member provided at the housing, and changing, to within a plane that includes the rotating axis of the light detector, optical paths of the light beams that are incident in the direction intersecting the rotating axis of the light detector.

12 Claims, 9 Drawing Sheets

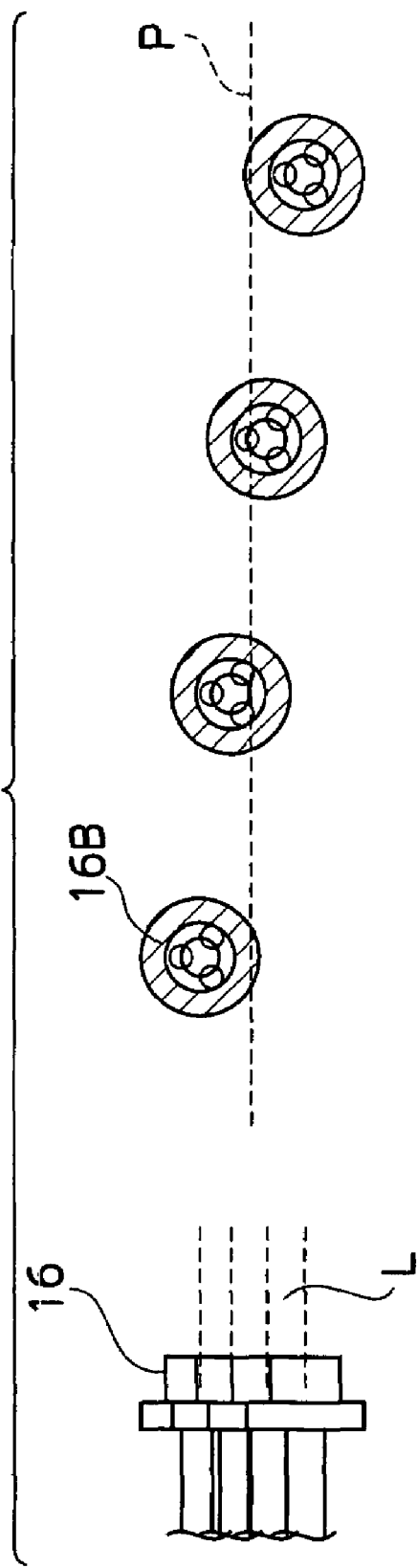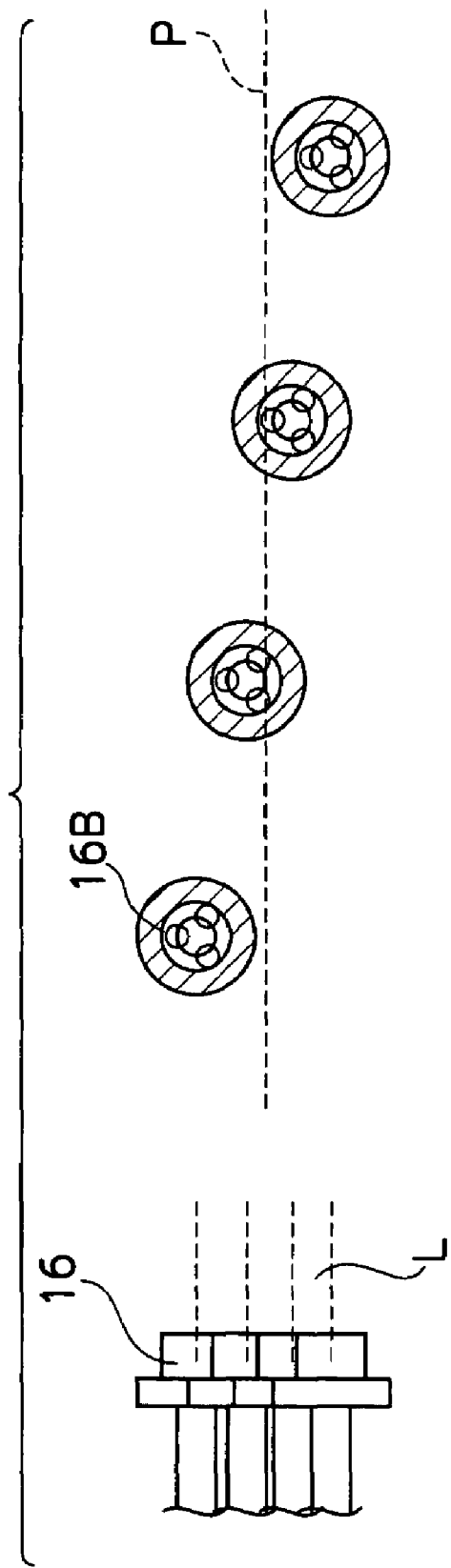

LIGHT SCANNING DEVICE AND IMAGE FORMING DEVICE

CROSS-REFERENCE TO RELATED APPLICATIONS

This application is based on and claims priority under 35 USC 119 from Japanese Patent Application No. 2006-204676 filed Jul. 27, 2006.

BACKGROUND

1. Technical Field

The present invention relates to a light scanning device and to an image forming device using the light scanning device.

2. Related Art

As a light scanning device which scans an object-to-be-scanned by light such as laser light or the like, there conventionally is a multibeam light source scanning device which scan light beams, which are emitted from plural light sources, onto an object-to-be-scanned such as a photosensitive drum or the like.

SUMMARY

An aspect of the present invention is a light scanning device including: a housing; a light deflector provided at the housing, and rotating deflecting surfaces thereof around a rotating shaft, and deflecting light beams; plural light sources provided at the housing, and emitting the light beams in a direction that intersects the rotating shaft of the light deflector; an imaging optical system provided at the housing, and focusing each of the plural light beams deflected by the light deflector onto a surface-to-be-scanned; and an optical path changing member provided at the housing, and changing, to within a plane that includes the rotating axis of the light detector, optical paths of the light beams that are incident in the direction intersecting the rotating axis of the light detector.

BRIEF DESCRIPTION OF THE DRAWINGS

Exemplary embodiments of the present invention will be described in detail based on the following figures, wherein:

FIG. 9A is a cross-sectional view showing light sources of a light scanning device relating to the exemplary embodiments of the present invention, and is an example of an array of light sources which is such that light beams are substantially parallel, and FIG. 9B is a cross-sectional view showing an example of an array of light sources which is such that light beams are not substantially parallel.

DETAILED DESCRIPTION

<Summary of Device>

Exemplary embodiments of the present invention will be described hereinafter with reference to the drawings.

Figure 1:
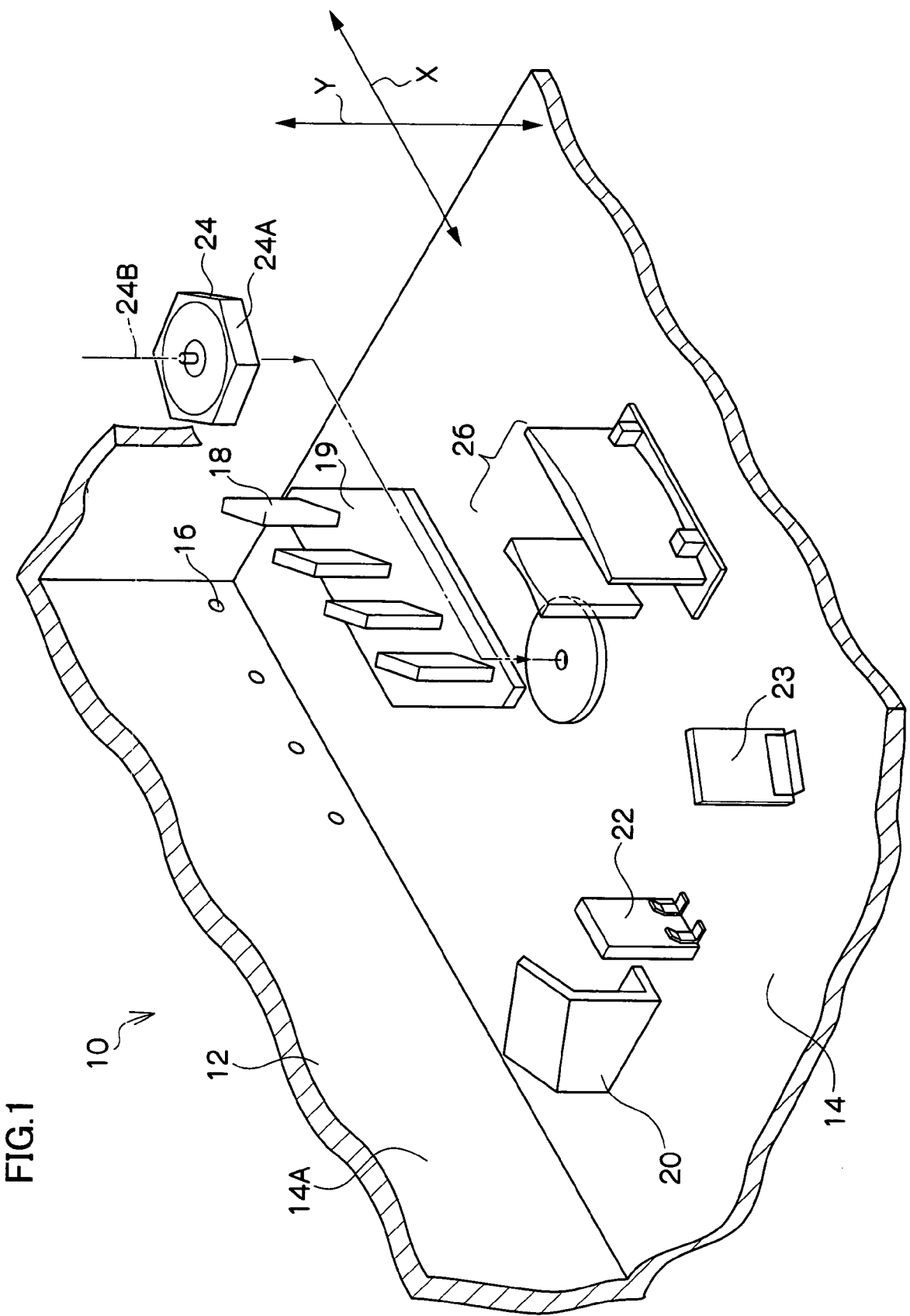
FIG. 1 is perspective view showing a light scanning device relating to a first exemplary embodiment of the present invention.
Figure 2:
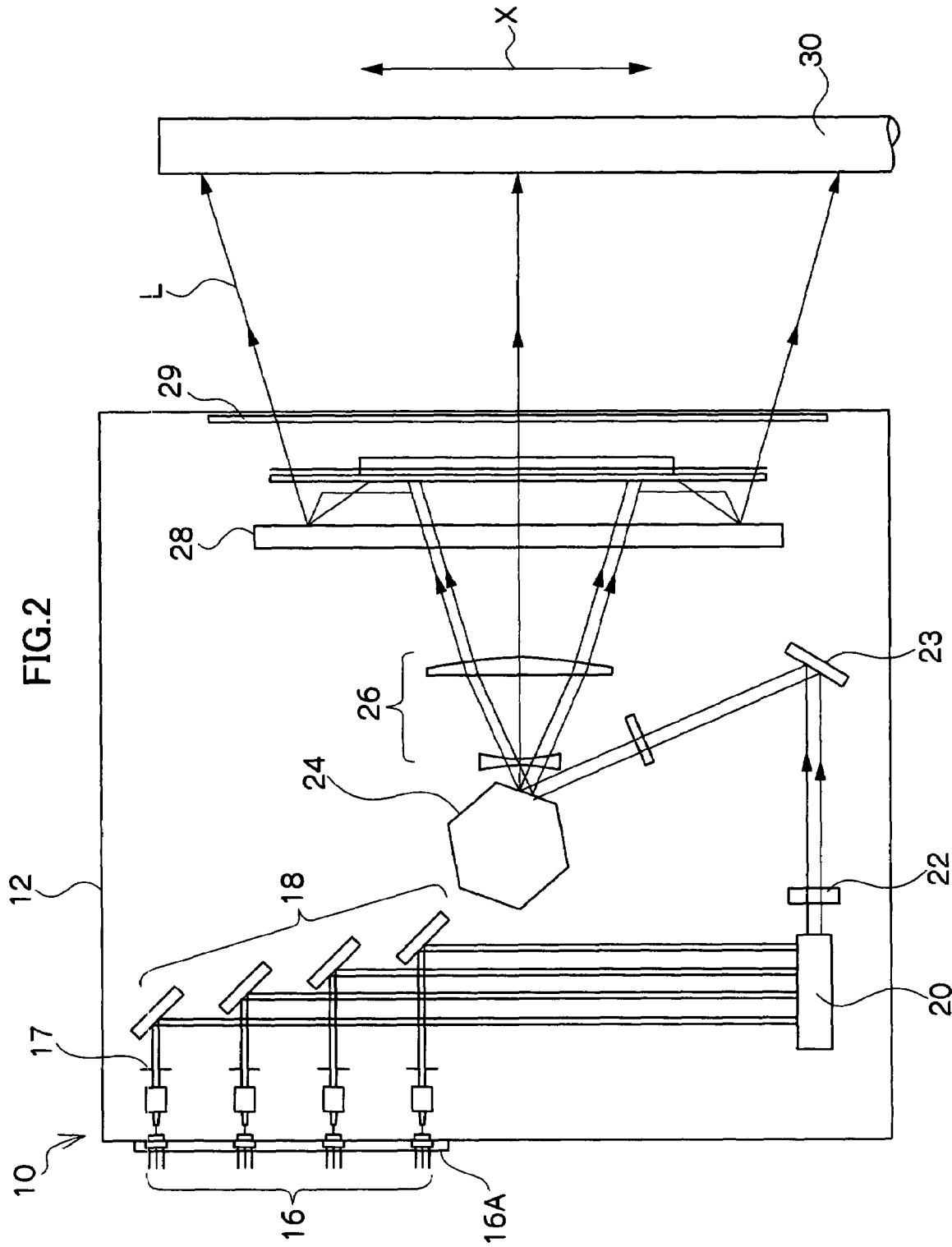
FIG. 2 is a plan view showing the light scanning device relating to the first exemplary embodiment of the present invention.
Figure 3:
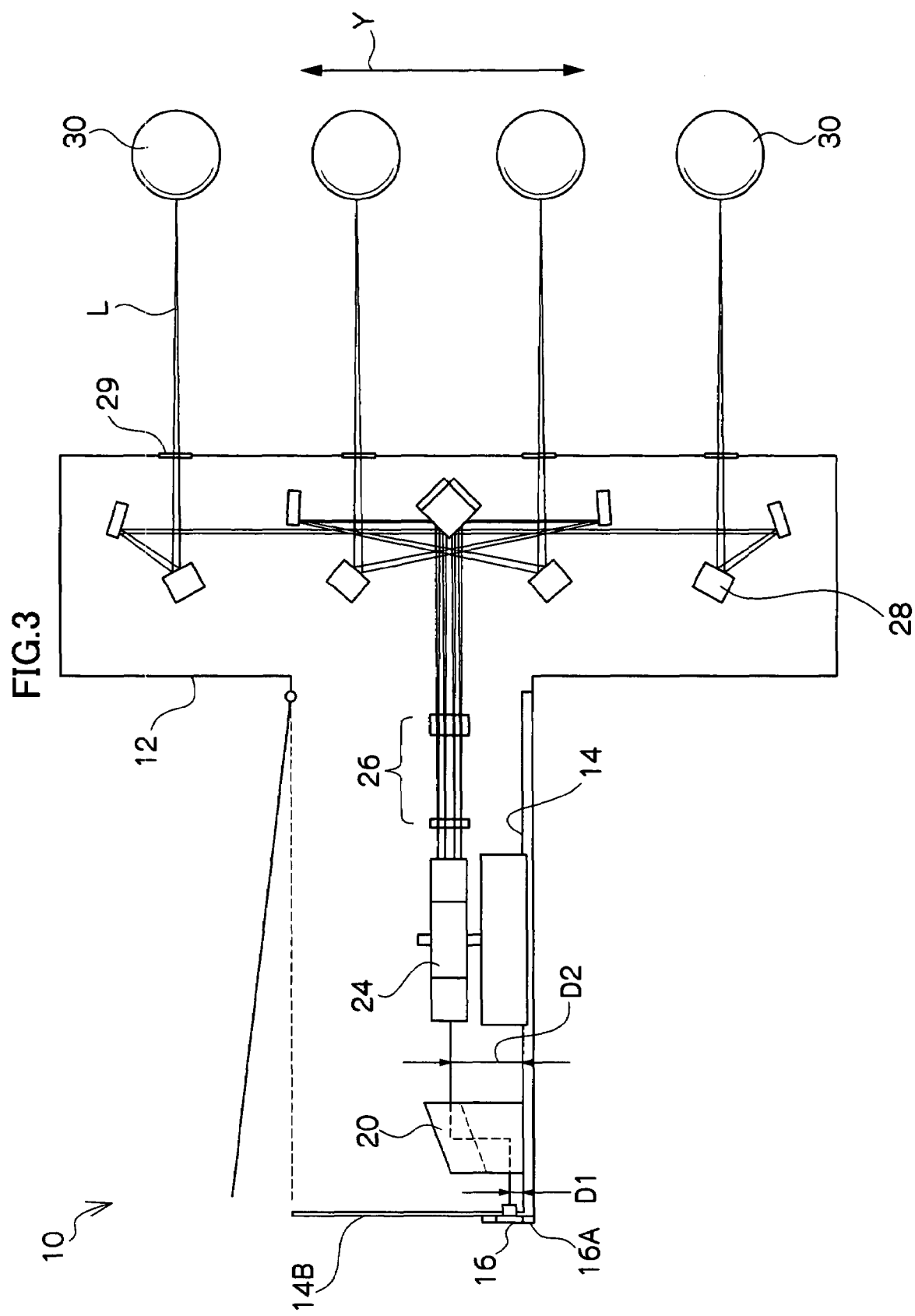
FIG. 3 is a cross-sectional view showing the light scanning device relating to the first exemplary embodiment of the present invention.

A light scanning device relating to a first exemplary embodiment of the present invention is shown in FIGS. 1 through 3.

FIG. 1 is a perspective view showing the internal structure of the light scanning device relating to the present exemplary embodiment.

As shown in FIG. 1, at a light scanning device 10, an optical base 14, which serves as a floor portion at which mounting portions of optical members are provided, is provided within a housing 12 which forms an optical box. A polygon mirror 24, which deflects incident light beams L in a main scanning direction (direction X in the drawing) due to deflecting surfaces 24A rotating around a rotating shaft 24B, is provided on the optical base 14.

The edge of the optical base 14 rises such that a standing portion 14A forms the side walls of the housing 12. Plural light sources 16, which emit light beams, are provided at the standing portion 14A along a plane which is substantially orthogonal to the rotating shaft 24B of the polygon mirror 24, i.e., at places which are a predetermined interval above the optical base 14 in FIG. 1. Here, "substantially orthogonal" means an angular range of about 3° from a plane which intersects the rotating shaft 24B at an angle of 90°.

As shown in FIG. 2, the plural light sources 16 are provided directly on a same light source driving circuit substrate 16A.

The direction of the rotating shaft 24B, i.e., the subscanning direction, is direction Y in the drawings, and the direction orthogonal thereto, i.e., the main scanning direction, is direction X in the drawings.

The light beams L which exit from the plural light sources 16 are narrowed to desired diameters at respective aperture diaphragms 17, and thereafter, are reflected by reflecting mirrors 18, and are incident on an optical path changing member 20. The reflecting mirrors 18 are fixed on a fixing member 19 which is provided on the optical base 14, such that the positions thereof in the Y direction are the same. The respective light beams L which are reflected at the reflecting mirrors 18 take optical paths in the same direction, and are incident on the optical path changing member 20.

At this time, the light beams L which exit from the light sources 16 are substantially parallel to one another, and are incident on and reflected by the reflecting mirrors 18 at the same angle. Here, "substantially parallel" means, for example, that the light beams L exiting from the light sources 16 do not diffuse nor intersect up to the reflecting mirrors 18, and that there exists a plane P which is parallel to the main scanning plane (X plane), and which includes a mounting reference plane 16B (the hatched portion in FIG. 9A) for the plural (four as an example here) light sources 16 as shown in FIG. 9A. Conversely, a case in which there does not exist a plane (X plane) which is parallel to the main scanning plane (X plane) and which includes the mounting reference plane 16B of the four light sources 16, such as shown in FIG. 9B for example, is considered "substantially not parallel" in the present application.

The optical path changing member 20 includes plural reflecting surfaces, and reflects the incident light beams L. As shown in FIG. 3, the optical paths of the light beams L, which are incident on the optical path changing member 20, pass through a place which is apart from the optical base 14 by distance D1, and the optical paths of the light beams L exiting from the optical path changing member 20 pass through a place which is apart from the optical base 14 by distance D2. Here, D1<D2.

The respective light beams L which are incident on the optical path changing member 20 are lined-up in the same arrayed direction (the main scanning direction) as the light sources 16 which are arrayed in the X direction. The arrayed direction of the respective light beams L which exit from the optical path changing member 20 becomes the Y direction (the subscanning direction), and the light beams L are incident on a cylindrical lens 22 which has the function of focusing in the subscanning direction.

The light beams L which exit from the cylindrical lens 22 are reflected by a mirror 23, are incident on the polygon mirror 24, and are deflected in the main scanning direction (X direction) by the deflecting surfaces 24A which rotate around the rotating shaft 24B.

The respective light beams L are arrayed in the Y direction (the subscanning direction) on the deflecting surface 24A at this time. Here, "arrayed in the subscanning direction" means that, for example, at the deflecting surface 24A of the polygon mirror 24, there exists a plane in the subscanning direction (Y direction) which includes the rotating shaft 24B and the four light beams L of the predetermined beam diameter (an intensity range of to about −13.5% from the optical axis central intensity is defined as the beam diameter).

The deflected light beams L are shaped by an imaging optical system 26, and pass through a cylindrical mirror 28 having the function of focusing in the subscanning direction and dustproof windows 29, and are focused as beam spots on photosensitive drums 30 (surfaces-to-be-scanned).

<Optical Path Changing Member>

Figure 4:
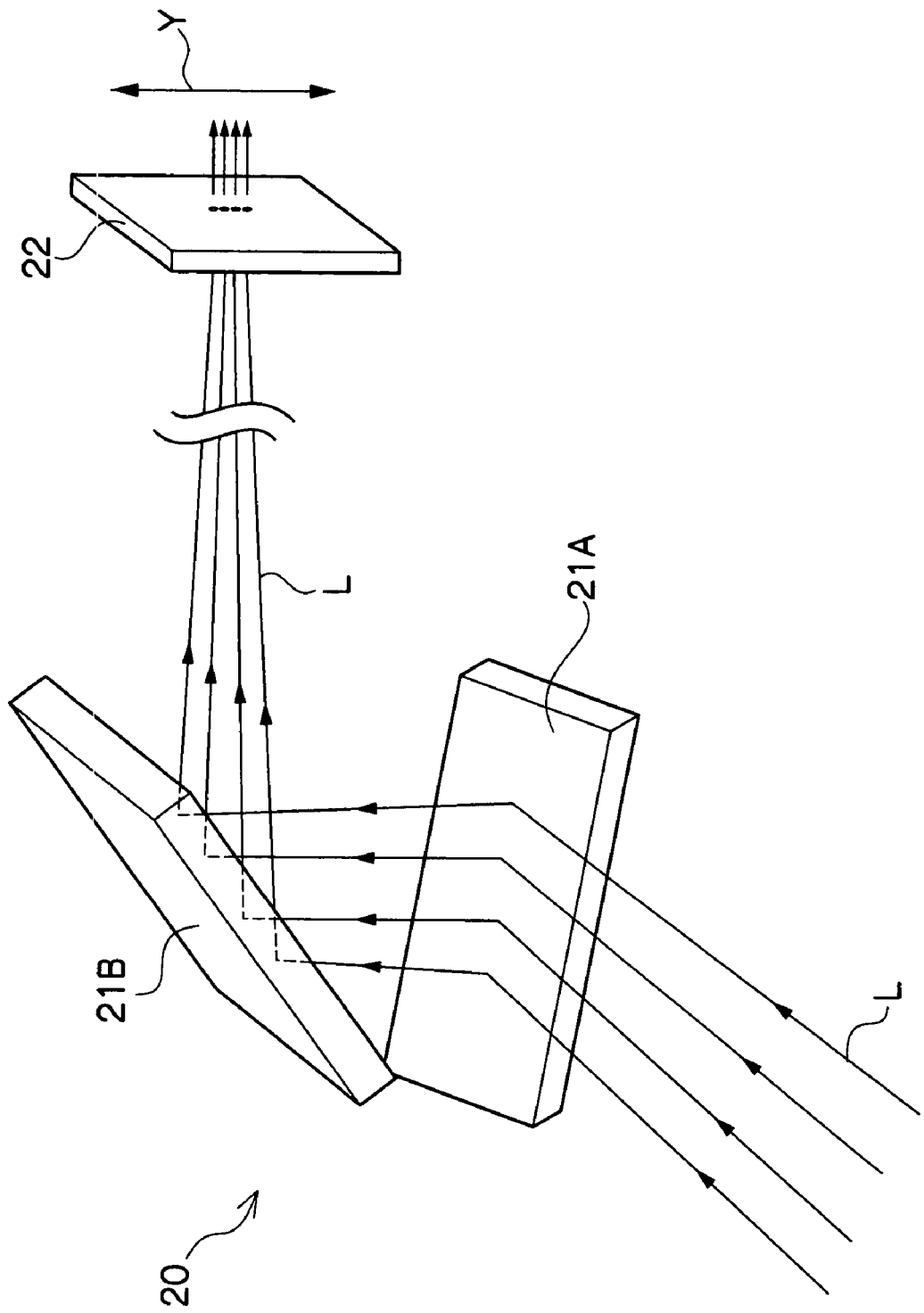
FIG. 4 is a perspective view showing an optical path changing optical system relating to the first exemplary embodiment of the present invention.

An optical path changing member relating to the first exemplary embodiment of the present invention is shown in FIG. 4.

As shown in FIG. 4, the optical path changing member 20 has plural mirrors 21A, 21B. First, the mirror 21A reflects the incident light beams L, and then the mirror 21B reflects the light beams L, such that the optical paths are changed to a direction in which the light beams L are incident on the cylindrical lens 22.

In the same way as the light sources 16, the optical paths of the incident light beams L are arrayed along a plane which is substantially orthogonal to the rotating shaft 24B of the polygon mirror 24 (i.e., are arrayed in the X direction), and, after being reflected at the mirror 21B, are arrayed in the subscanning direction (direction Y in the figure).

Figure 5:
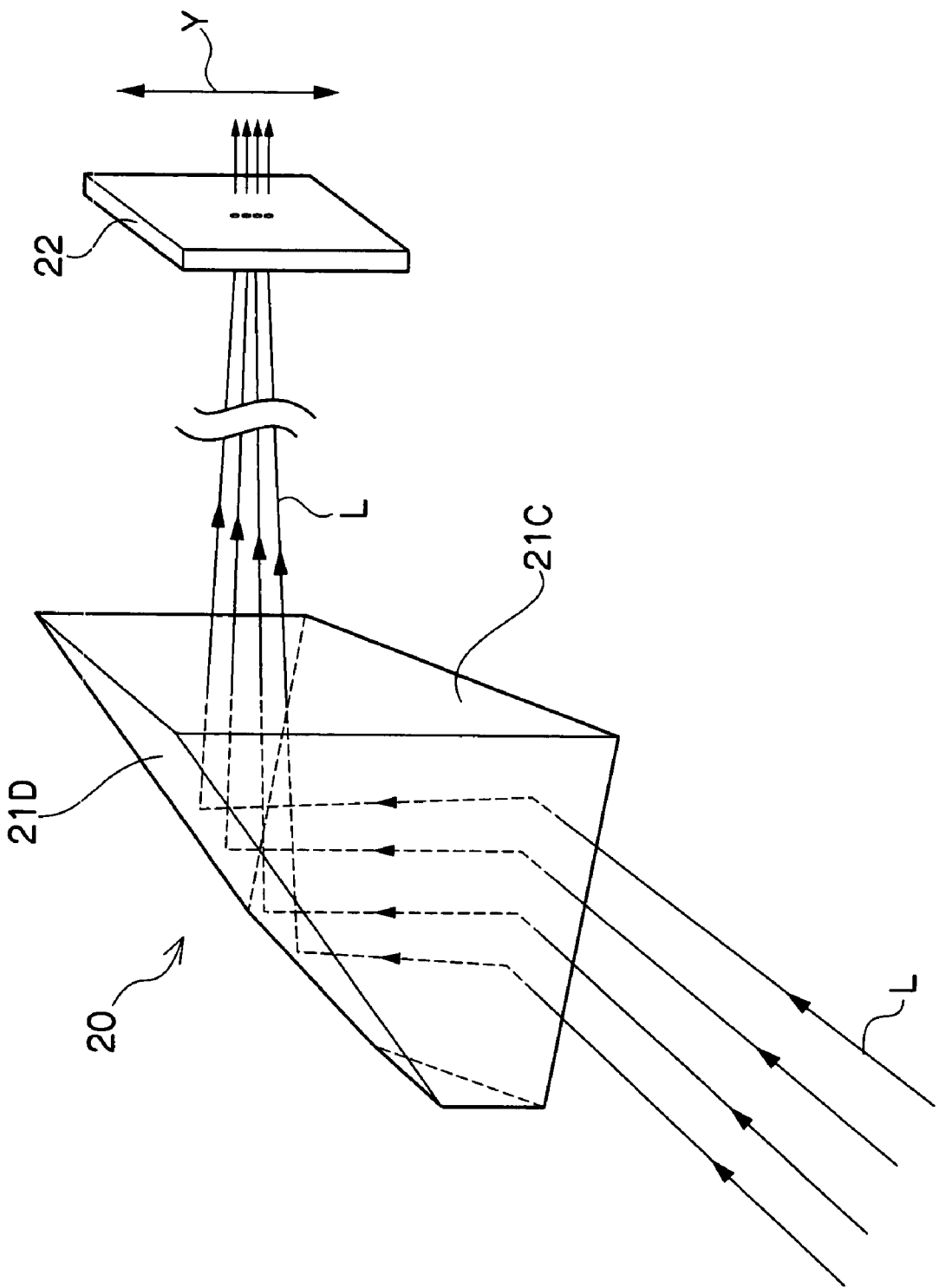
FIG. 5 is a perspective view showing an optical path changing optical system relating to a second exemplary embodiment of the present invention.

An optical path changing member relating to a second exemplary embodiment of the present invention is shown in FIG. 5.

As shown in FIG. 5, the optical path changing member 20 is a prism which has plural reflecting surfaces 21C, 21D. First, the reflecting surface 21C reflects the incident light beams L, and then the reflecting surface 21D reflects the light beams L, such that the optical paths are changed to a direction in which the light beams L are incident on the cylindrical lens 22.

In the same way as the light sources 16, the optical paths of the incident light beams L are arrayed along a plane which is substantially orthogonal to the rotating shaft 24B of the polygon mirror 24 (i.e., are arrayed in the X direction), and, after being reflected at the reflecting surface 21D, are arrayed in the subscanning direction (direction Y in the figure).

Figure 6:
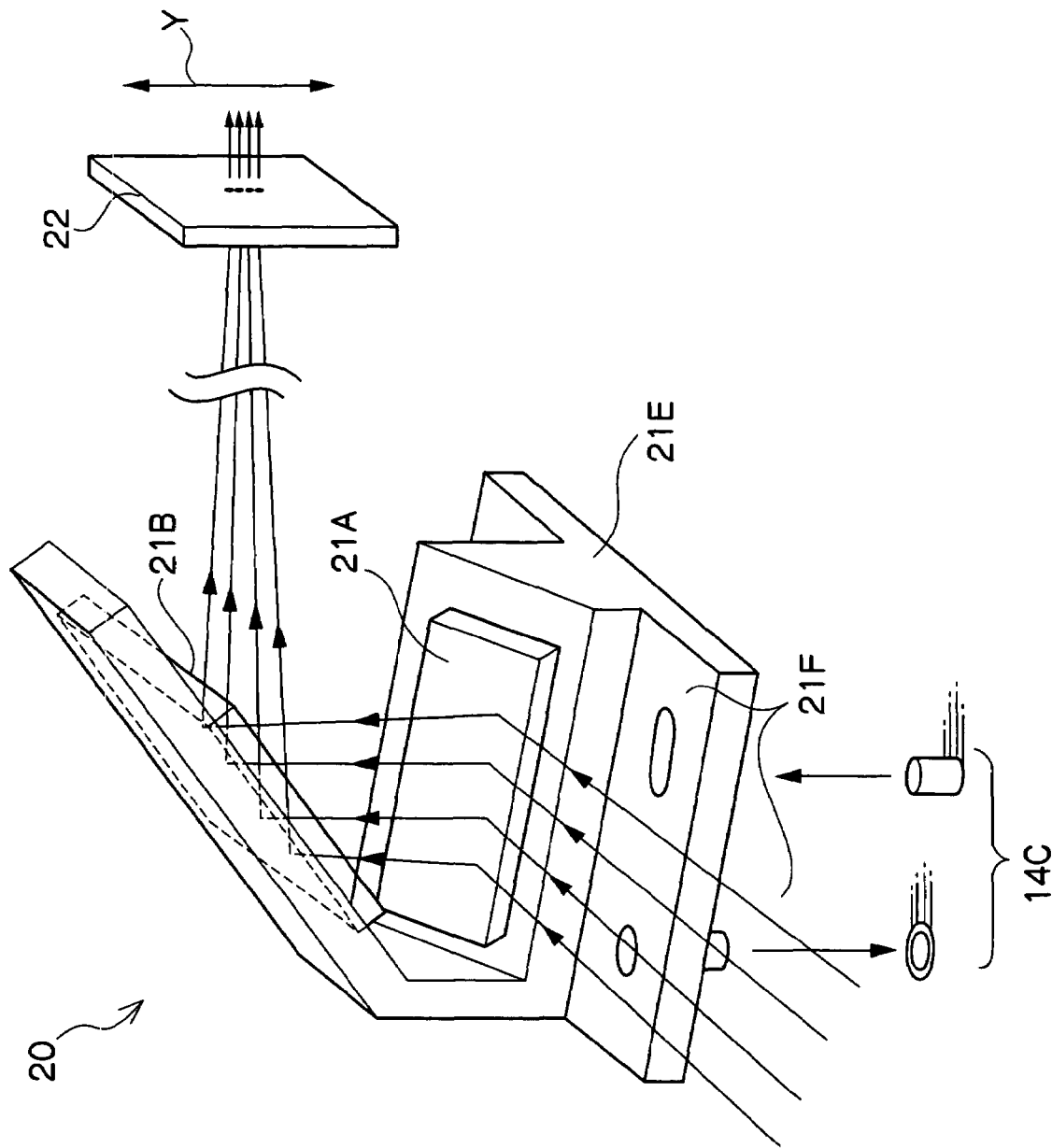
FIG. 6 is a perspective view showing an optical path changing optical system relating to a third exemplary embodiment of the present invention.

An optical path changing member relating to a third exemplary embodiment of the present invention is shown in FIG. 6.

As shown in FIG. 6, the optical path changing member 20 has the plural mirrors 21A, 21B. First, the mirror 21A reflects the incident light beams L, and then the mirror 21B reflects the light beams L, such that the optical paths are changed to a direction in which the light beams L are incident on the cylindrical lens 22.

The mirrors 21A, 21B are fixed integrally to a frame 21E. The optical path changing member 20 which combines the mirrors 21A, 21B and the frame 21E can be treated as a single part. The optical path changing member 20 is mounted at a mounting portion 21F to a mounting portion 24C which is provided at the optical base 14.

In the same way as the light sources 16, the optical paths of the incident light beams L are arrayed along a plane which is substantially orthogonal to the rotating shaft 24B of the polygon mirror 24 (i.e., are arrayed in the X direction), and, after being reflected at the mirror 21B, are arrayed in the subscanning direction (direction Y in the figure).

<Deformation of Housing, and Positions of Light Sources>

Figure 7:
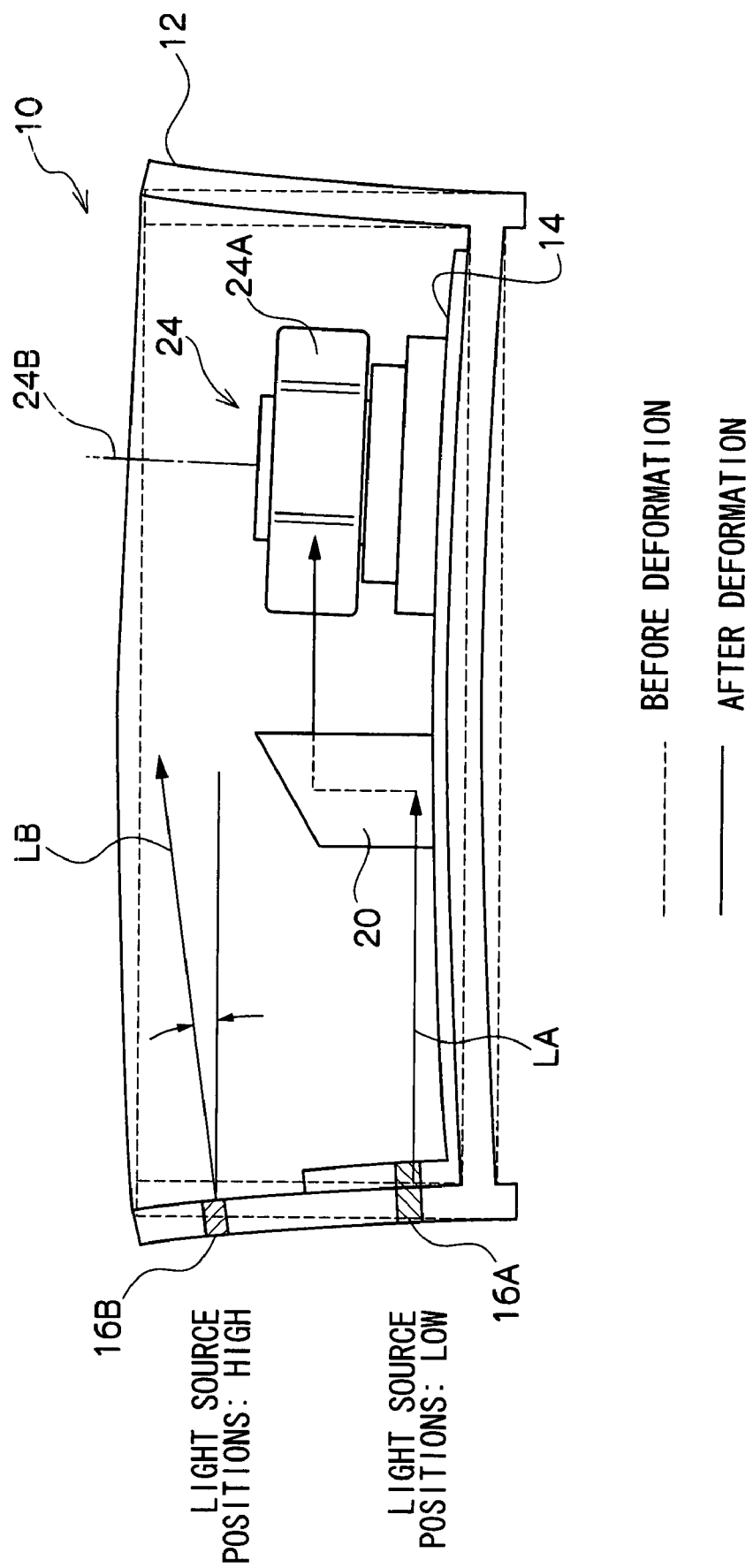
FIG. 7 is a cross-sectional view showing a light scanning device relating to the exemplary embodiments of the present invention.

A light scanning device relating to the exemplary embodiments of the present invention is shown in FIG. 7.

FIG. 7 is a cross-sectional view showing the internal structure of a light scanning device relating to the exemplary embodiments.

As shown in FIG. 7, at the light scanning device 10, the optical base 14 is provided within the housing 12 which forms an optical box. The polygon mirror 24, which deflects the incident light beams L in the main scanning direction (direction X in the drawing) due to the deflecting surfaces 24A rotating around the rotating shaft 24B, is provided on the optical base 14.

Due to the effects of heat sources existing within and outside of the light scanning device 10, the housing 12 deforms from the initial state shown by the dotted line in FIG. 7 to the configuration shown by the solid line due to heat.

In a case in which the light sources 16 are provided at the side wall of the housing 12, if the light sources 16 are at a place which is apart from the optical base 14 (light source positions: high), the optical axis of a light beam LB exiting from a light source 16B becomes as shown in FIG. 7 because the angle of the side wall as well fluctuates due to the deformation of the housing 12 due to heat.

In a case in which the light sources 16 are provided at the side wall of the housing 12, if the light sources 16 are at a place which is close to the optical base 14 (light source positions: low), the optical axis of a light beam LA exiting from a light source 16A becomes as shown in FIG. 7 because there is little effect on the fluctuation in the angle of the side wall due to the deformation of the housing 12 due to heat.

<Image Forming Device>

Figure 8:
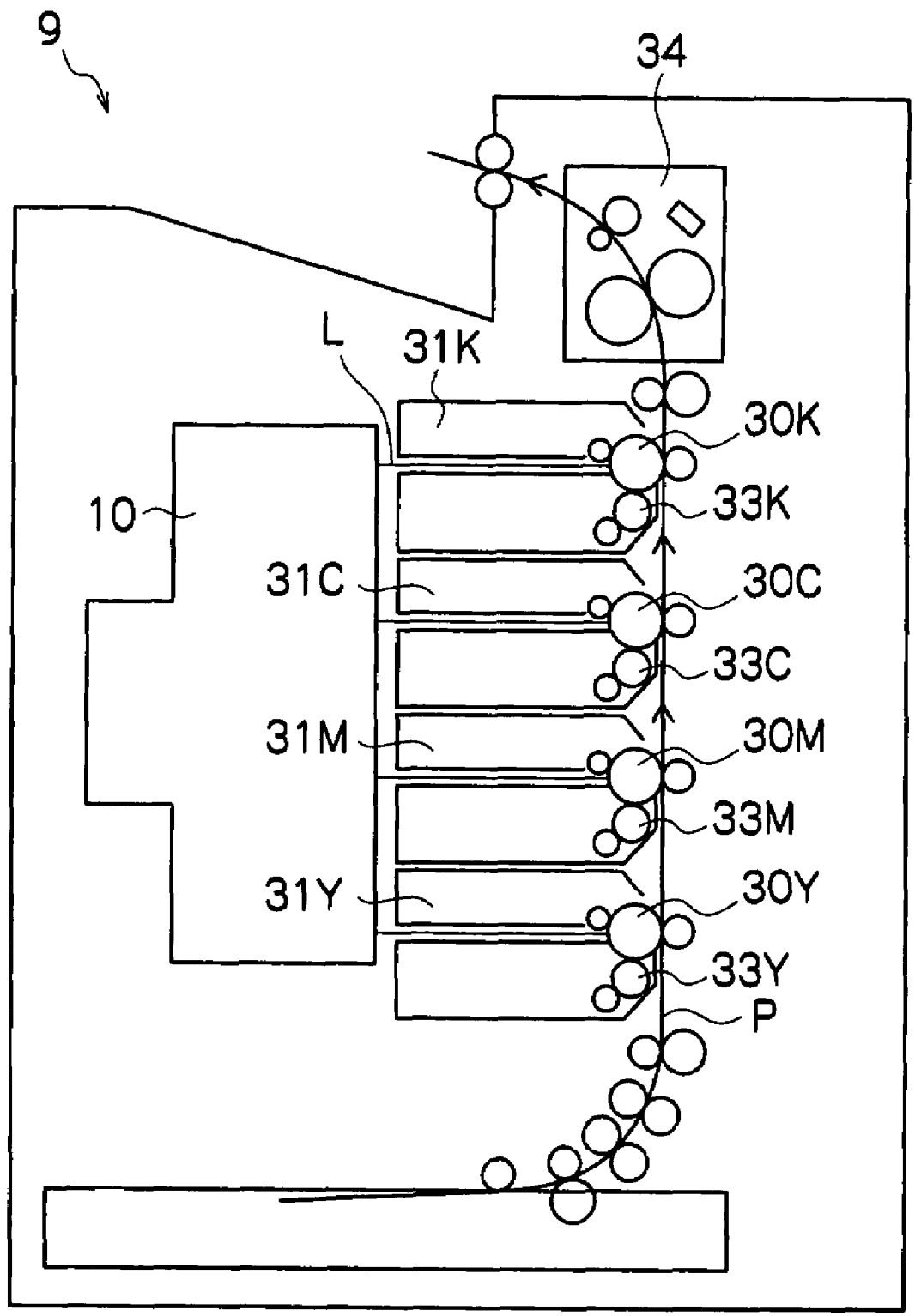
FIG. 8 is a cross-sectional view showing an image forming device relating to a fourth exemplary embodiment of the present invention.

An image forming device relating to a fourth exemplary embodiment of the present invention is shown in FIG. 8.

FIG. 8 is a cross-sectional view showing the internal structure of the image forming device relating to the present exemplary embodiment.

As shown in FIG. 8, the main portions of the image forming device 9 are structured by developing devices 31Y through 31K which have photosensitive drums 30Y through 30K of the colors of yellow (Y), magenta (M), cyan (C), and black (K) respectively, charging rollers for uniform charging which contact the photosensitive drums 30Y through 30K, and the light scanning device 10 which illuminates light beams modulated in accordance with image signals of the respective colors of yellow (Y), magenta (M), cyan (C), and black (K). The light scanning device described in the above respective exemplary embodiments can be applied as the light scanning device 10.

The image forming device 9s is a so-called tandem color printer in which the photosensitive drums 30Y, 30M, 30C, 30K are disposed at uniform intervals so as to have a common contact (tangential) plane. The light beams L corresponding to the respective colors of yellow (Y), magenta (M), cyan (C), and black (K) are illuminated by the light scanning device 10, which serves as an exposure device, onto the surfaces of the photosensitive drums 30Y through 30K to which surface potentials have been applied, and electrostatic latent images corresponding to the input image information of the respective colors are formed thereon.

Developing bias voltage is applied to developing rollers 33, and toner on the developing rollers 33 is transferred to the electrostatic latent images formed on the photosensitive drums 30Y through 30K. In this way, toner images of the respective colors of yellow (Y), magenta (M), cyan (C), and black (K) are formed.

The toner images of the respective colors of yellow (Y), magenta (M), cyan (C), and black (K), which are formed on the respective photosensitive drums 30Y through 30K, are registered on a sheet P, and are transferred thereon so as to be superposed one on the other. In this way, a final full-color toner image is formed on the sheet P as a four-color image in which cyan (C), magenta (M), and black (K) are superposed on the Y single-color image.

Exemplary embodiments of the present invention have been described above. However, the present invention is not limited to the above exemplary embodiments, and can, of course, be embodied in various forms within a range which does not deviate from the gist of the present invention.

For example, the above exemplary embodiment describes, as an example, a four-color, full-color laser beam printer. However, the present invention is not limited to the same, and, for example, printers of three or fewer colors or of five or more colors may be used.

Further, although the polygon mirror is used as the deflecting element, instead, a resonant scanner or a galvano mirror may be used.

What is claimed is:

1. A light scanning device comprising:
    a housing;
    a light deflector provided at the housing, and rotating deflecting surfaces thereof around a rotating shaft, and deflecting light beams;
    a plurality of light sources provided at the housing, and emitting the light beams in a plane that is substantially orthogonal to the rotating shaft of the light deflector, wherein the plurality of light sources are disposed along a single plane that is substantially orthogonal to the shaft of the light deflector;
    an imaging optical system provided at the housing, and focusing each of the plurality of light beams deflected by the light deflector onto a surface-to-be-scanned; and
    an optical path changing member provided at the housing that changes orientation of optical paths of the light beam traveling in a plane substantially orthogonal to the rotating axis of the light deflector to a plane parallel to the rotation axis of the light deflector.

2. The light scanning device of claim 1, further comprising a plurality of reflecting mirrors that respectively reflect the plurality of light beams, which are emitted from the plurality of light sources, and make the light beams incident on the optical path changing member.

3. The light scanning device of claim 1, wherein
    the housing comprises a base portion, and
    optical paths of the plurality of light beams, that pass through the optical path changing member, are changed to a direction of moving away from the base portion at which the light deflector is mounted.

4. The light scanning device of claim 3, wherein the housing comprises a side wall that rises-up from the base portion, and the plurality of light sources are provided at the side wall.

5. The light scanning device of claim 2, wherein the plurality of reflecting mirrors are mounted at positions that are equal distances from a plane including the plurality of light beams that are emitted from the light sources.

6. The light scanning device of claim 1, wherein the optical path changing member is structured by combining optical elements that include a plurality of reflecting surfaces.

7. The light scanning device of claim 1, wherein the optical path changing member is a prism.

8. The light scanning device of claim 2, wherein the plurality of light beams, that are reflected by the plurality of reflecting mirrors, are parallel to one another.

9. The light scanning device of claim 1, further comprising at least one light source driving circuit substrate,
    wherein the plurality of light sources are disposed at the same light source driving circuit substrate.

10. An image forming device comprising:
    the light scanning device of claim 1;
    a plurality of photosensitive bodies on which electrostatic latent images are formed by the light scanning device; and
    an image forming section transferring the electrostatic latent images onto a recording medium as toner images.

11. The light scanning device of claim 1, wherein the optical path changing member is disposed in the optical paths of the light beams between the plurality of light sources and the light deflector.

12. The light scanning device of claim 1, wherein the plurality of light sources are disposed at a position close to the base of the housing relative to the rotating deflecting surfaces of the light deflector.

* * * * *